(12) United States Patent
Aronsson et al.

(10) Patent No.: US 9,323,342 B2
(45) Date of Patent: Apr. 26, 2016

(54) USER INTERFACE WITH LOCATION MAPPING

(71) Applicants: Pär-Anders Aronsson, Malmö (SE); Henrik Sven Bengtsson, Lund (SE); Håkan Jonsson, Malmö (SE); Linus Mårtensson, Lund (SE); Ola Thörn, Limhamn (SE)

(72) Inventors: Pär-Anders Aronsson, Malmö (SE); Henrik Sven Bengtsson, Lund (SE); Håkan Jonsson, Malmö (SE); Linus Mårtensson, Lund (SE); Ola Thörn, Limhamn (SE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/370,334

(22) PCT Filed: Oct. 22, 2013

(86) PCT No.: PCT/IB2013/002356
§ 371 (c)(1),
(2) Date: Jul. 2, 2014

(87) PCT Pub. No.: WO2014/064506
PCT Pub. Date: May 1, 2014

(65) Prior Publication Data
US 2015/0029094 A1    Jan. 29, 2015

Related U.S. Application Data

(60) Provisional application No. 61/716,840, filed on Oct. 22, 2012.

(51) Int. Cl.
*G06F 3/01* (2006.01)
*G01C 21/36* (2006.01)
*G06F 17/30* (2006.01)

(52) U.S. Cl.
CPC ............ *G06F 3/017* (2013.01); *G01C 21/3679* (2013.01); *G06F 3/011* (2013.01); *G06F 17/3087* (2013.01)

(58) Field of Classification Search
CPC ..... G01C 21/3679; G06F 3/017; G06F 3/011; G06F 17/3087
USPC .......................................... 345/7–8; 715/863
See application file for complete search history.

(56) References Cited

U.S. PATENT DOCUMENTS

| 6,278,940 B1* | 8/2001 | Endo ................. G01C 21/3611 340/988 |
| 8,239,130 B1* | 8/2012 | Upstill et al. ................. 701/426 |
| 2007/0266005 A1 | 11/2007 | Blommesteijn |
| 2007/0282564 A1 | 12/2007 | Sprague et al. |

(Continued)

OTHER PUBLICATIONS

Nobuchika Sakata et al.: "Mobile Interfaces Using Body Worn Projector and Camera"; Jul. 19, 2009, Virtual and Mixed Reality, Springer Berlin Heidelberg, Berlin, Heidelberg, pp. 106-113.

(Continued)

*Primary Examiner* — Michael Pervan
(74) *Attorney, Agent, or Firm* — Tucker Ellis LLP (57) ABSTRACT

A system includes a processing logic and output logic. The processing logic is configured to receive information identifying points of interest, identify at least one of location or distance information from each of the points of interest to the system, and sort the points of interest based on the location or distance information. The output logic is configured to project information identifying the points of interest onto a surface, wherein the projected information is displayed in accordance with the sorting.

15 Claims, 6 Drawing Sheets

(56) References Cited

U.S. PATENT DOCUMENTS

2012/0249409 A1   10/2012   Toney et al.
2013/0339027 A1*  12/2013   Dokor ..................... G06F 17/20
                                                          704/275

OTHER PUBLICATIONS

International Search Report and Written Opinion dated May 23, 2014 issued in corresponding PCT application No. PCT/IB2013/002356, 12 pages.

* cited by examiner

USER INTERFACE WITH LOCATION MAPPING

TECHNICAL FIELD

The invention relates generally to providing a user interface for display on a surface and, more particularly, to providing location or distance information via the user interface based on the manner in which items of interest are displayed.

BACKGROUND ART

Augmented reality (AR) devices, such as AR visors or glasses, are used to display information to users. For example, an AR visor typically includes a virtual screen in which information is displayed. However, information displayed via a virtual screen often results in a cluttered user interface in which it is difficult to easily ascertain information of interest.

SUMMARY

According to one aspect, a system is provided. The system includes processing logic and output logic. The processing logic is configured to receive information identifying points of interest, identify at least one of location or distance information from each of the points of interest to the system, and sort the points of interest based on the location or distance information. The output logic is configured to project information identifying the points of interest onto a surface, wherein the projected information is displayed in accordance with the sorting.

Additionally, when projecting information, the output logic may be configured to display the points of interest on the surface in an order, wherein a first point of interest located closest to the system is displayed at one end of the surface and a second point of interest located furthest from the system is displayed at an opposite end of the surface.

Additionally, the surface may comprise a hand or arm of a user associated with the system or a virtual screen.

Additionally, when projecting information, the output logic may be configured to space the points of interest projected onto the surface based on geographical distances between the points of interest, wherein the spacing between the points of interest is less for points of interest located shorter geographical distances apart than for points of interest located greater geographical distances apart.

Additionally, when projecting information, the output logic may be configured to provide at least one of different colors or different font sizes for at least some of the projected points of interest, wherein the different colors or font sizes convey relative geographical distance information from the points of interest to the system.

Additionally, when projecting information, the output logic may be configured to dynamically update the projected information as the device moves, based on updated geographical distances from the system to the points of interest.

Additionally, the processing logic may be further configured to determine a direction in which a user's finger, hand or arm is pointing, and identify points of interest based on the direction.

Additionally, the processing logic may be further configured to detect a change in the direction in which the user's finger, hand or arm is pointing, and identify new points of interest based on the changed direction, and wherein the output logic may be further configured to project information onto the surface identifying the new points of interest.

Additionally, the surface may comprise a table or the ground.

Additionally, the processing logic may be located in a mobile terminal or a portable computer and the output control logic may be located in an augmented reality device.

According to another aspect, a method is provided. The method comprises receiving, by a device, information identifying points of interest; identifying at least one of location or distance information from the device to each of the points of interest; sorting the points of interest based on the location or distance information; and projecting information identifying the points of interest onto a surface, wherein the projected information is displayed in accordance with the sorting.

Additionally, the surface may comprise a user's hand or arm.

Additionally, the method may further comprises displaying the points of interest on the surface in an order, wherein a first point of interest located closest to the device is displayed at one end of the surface and a second point of interest located furthest from the device is displayed at an opposite end of the surface.

Additionally, the projecting information may comprise spacing the items of interest projected onto the surface based on geographical distances between the points of interest, wherein the spacing between the points of interest is less for points of interest located shorter geographical distances apart than for points of interest located greater geographical distances apart.

Additionally, the projecting information may comprise providing at least one of different colors or different font sizes for at least some of the projected points of interest, wherein the different colors or font sizes convey relative geographical distance information from the points of interest to the device.

Additionally, the method may further comprise dynamically update the projected information as the device moves, based on updated geographical distances from the device to each of the points of interest.

Additionally, the method may further comprise determining a direction in which a user's finger, hand or arm is pointing; and identifying points of interest based on the direction.

Additionally, the method may further comprise detecting a change in the direction in which the user's finger, hand or arm is pointing; identifying new points of interest based on the changed direction; and projecting information onto the surface identifying the new points of interest.

According to still another aspect, a computer-readable medium having stored thereon sequences of instructions is provided. The instructions, when executed by at least one processor, cause the at least one processor receive information identifying points of interest; identify at least one of location or distance information from each of the points of interest to a device in which the computer-readable medium is stored; sort the points of interest based on the location or distance information; and output, to a projection device for projection onto a surface, information identifying the points of interest, wherein the information will be displayed in accordance with the sorting.

Additionally, the projection device may comprise an augmented reality projection device.

BRIEF DESCRIPTION OF DRAWINGS

Reference is made to the attached drawings, wherein elements having the same reference number designation may represent like elements throughout.

DESCRIPTION OF EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims and their equivalents.

Figure 1:
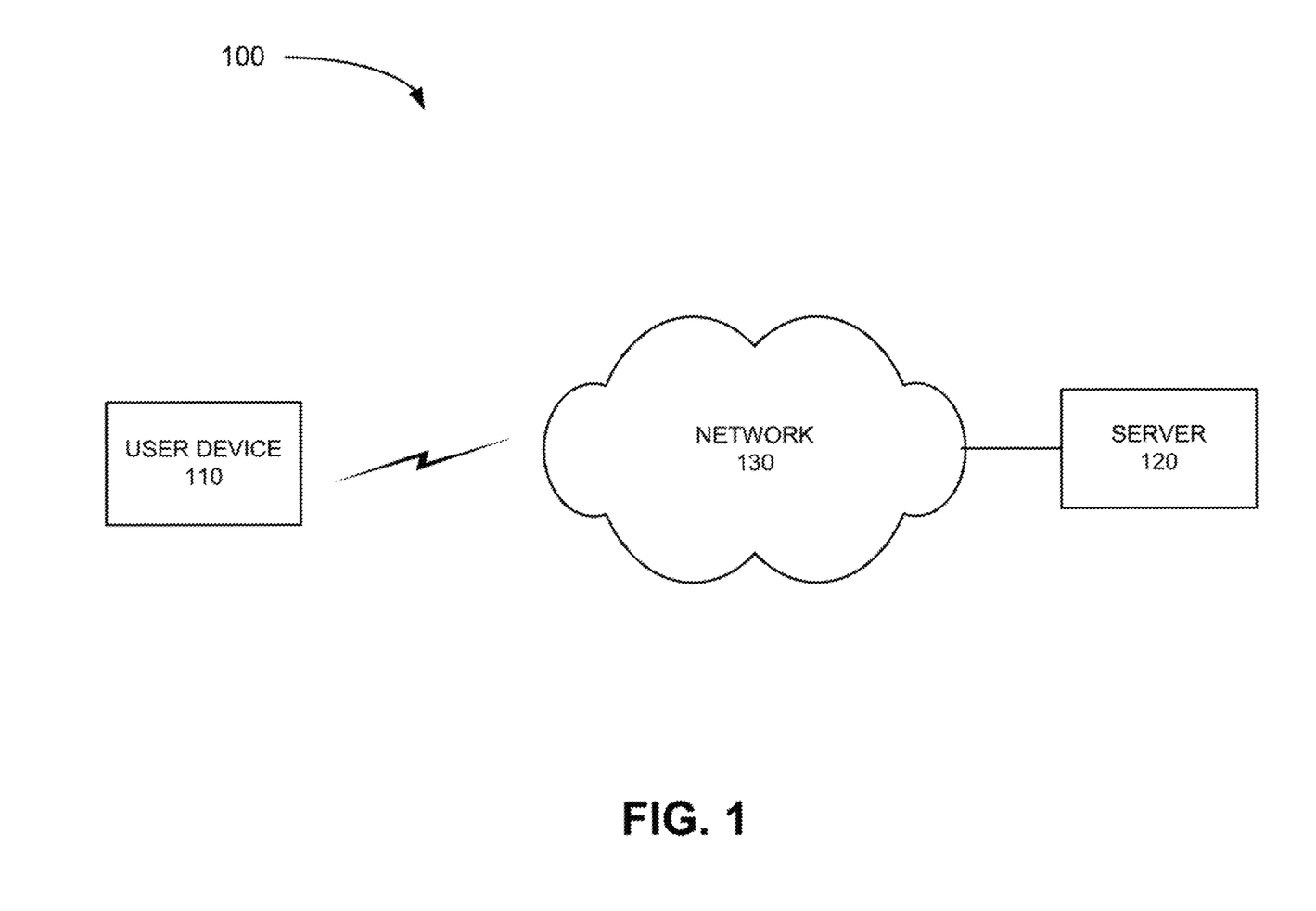
FIG. 1 is a diagram of an exemplary network in which systems and methods described herein may be implemented.

FIG. 1 is a diagram of an exemplary network 100 in which systems and methods described herein may be implemented. Referring to FIG. 1, network 100 may include user device 110, server 120 and network 130. User device 110 may include any type of processing device which is able to communicate with other devices in network 100. For example, user device 110 may include any type of device that is capable of transmitting and receiving data (e.g., voice, text, images, multi-media data) to and/or from other devices or networks (e.g., server 120 and network 130).

In an exemplary implementation, user device 110 may be a mobile terminal, such as a cellular radiotelephone with data processing and communications capabilities (e.g., a smart phone), a personal digital assistant (PDA) that can include a radiotelephone, etc. User device 110 may also include a personal computer (PC), a laptop computer, a tablet computer, netbook, a web-based appliance, a music or video playing device (e.g., an MPEG audio and/or video player), a video game playing device, a camera, a global positioning system (GPS) device, etc., that is able to communicate via a network, such as network 130. In each case, user device 110 may communicate with other devices in network 100 via wired, wireless, or optical connections, as described in detail below.

Server 120 may include one or more computing devices, servers and/or backend systems that are able to connect to network 130 and transmit and/or receive information via network 130. In an exemplary implementation, server 120 may provide information to user device 110, such as web pages, multi-media information (e.g., television shows, movies, sporting events, podcasts), information regarding points of interest (e.g., information responsive to queries from user device 110), directions and/or distance information to points of interest, etc.

Network 130 may include one or more wired, wireless and/or optical networks that are capable of receiving and transmitting data, voice and/or video signals, including multi-media signals that include voice, data and video information. For example, network 130 may include one or more public switched telephone networks (PSTNs) or other type of switched network. Network 130 may also include one or more wireless networks and may include a number of transmission towers for receiving wireless signals and forwarding the wireless signals toward the intended destinations. Network 130 may further include one or more satellite networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data.

The configuration illustrated in FIG. 1 is provided for simplicity. It should be understood that a typical network may include more or fewer devices than illustrated in FIG. 1. For example, network 100 may include additional elements, such as additional user devices and/or networks. Network 100 may also include switches, gateways, routers, backend systems, etc., that aid in routing information, such as media streams between various components illustrated in FIG. 1.

Figure 2:
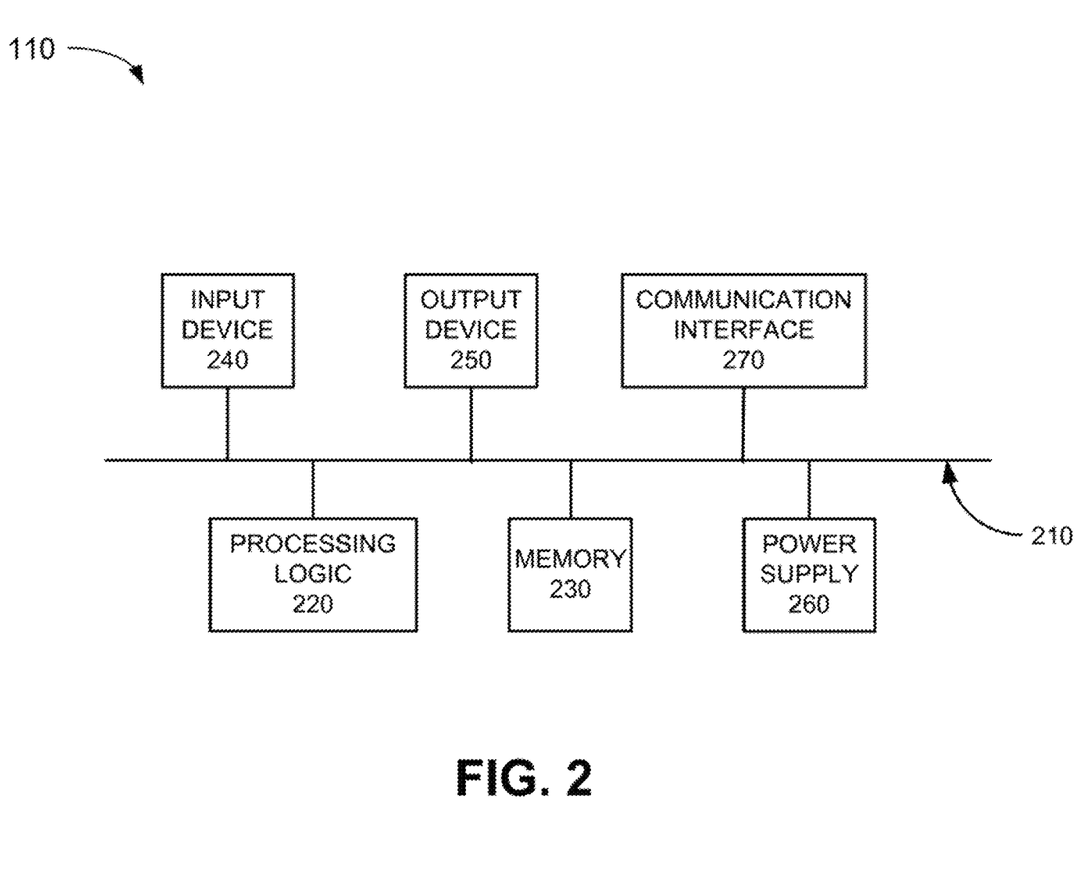
FIG. 2 is a functional block diagram of exemplary components implemented in the user device of FIG. 1.

FIG. 2 is a diagram illustrating components of user device 110 according to an exemplary implementation. User device 100 may include a bus 210, processing logic 220, a memory 230, an input device 240, an output device 250, a power supply 260 and a communication interface 270. One skilled in the art would recognize that user device 110 may be configured in a number of other ways and may include other or different elements. For example, user device 110 may include one or more modulators, demodulators, encoders, decoders, etc., for processing data.

Bus 210 permits communication among the components of user device 110. Processing logic 220 may include a processor, microprocessor, an application specific integrated circuit (ASIC), field programmable gate array (FPGA) or other processing logic. Processing logic 220 may execute software instructions/programs or data structures to control operation of user device 110.

Memory 230 may include a random access memory (RAM) or another type of dynamic storage device that stores information and instructions for execution by processing logic 220; a read only memory (ROM) or another type of static storage device that stores static information and instructions for use by processing logic 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processing logic 220. Instructions used by processing logic 220 may also, or alternatively, be stored in another type of computer-readable medium accessible by processing logic 220. A computer-readable medium may include one or more memory devices.

Input device 240 may include mechanisms that permit an operator to input information to user device 110, such as a microphone, keypad, control buttons, a keyboard (e.g., a QWERTY keyboard, a Dvorak keyboard, etc.), a display (e.g., a touch screen liquid crystal display (LCD)), a gesture-based device, an optical character recognition (OCR) based device, a joystick, a virtual keyboard, a mouse, a pen, voice recognition and/or biometric mechanisms, etc.

In an exemplary implementation, input device 240 may include a magnetometer and/or a global positioning system (GPS) that can be used to detect a location associated with user device 110 and/or a user associated with user device 110, and a direction which user device 110 and/or the user associated with user device 110 is moving.

Input device 240 may also include one or more sensors, such as a gyro or accelerometer. For example, a gyro and/or accelerometer may be mounted on the arm or hand of a user of user device 110 to detect the direction in which the user's arm, hand or finger(s) is pointing. Input device 240 may also include an infrared (IR) camera, a video camera or a motion capturing system that is able to identify a direction in which a user's arm, hand or finger(s) is pointing.

Input device 240 may also include one or more acoustic sensors that detect acoustic information associated with pressing or tapping on different points of the human body. For example, when a user taps his/her finger on a portion of his/her skin, acoustic energy is generated and some of the acoustic energy propagates on the surface of the skin. One or more acoustic sensors located, for example, on a wrist band worn by the user associated with user device 110 can detect the acoustic signals and determine a location at which the user tapped.

Output device 250 may include one or more mechanisms that output information to the user, including a display, a printer, one or more speakers, etc. In an exemplary implementation, output device 250 may include an AR output device. In such implementations, output device 250 may include an AR visor that projects images onto a virtual surface, AR glasses that project information onto a real surface, such as a user's arm, hand, leg, foot, a table, a wall, the ground, etc. In other implementations, output device 250 may include other types of projection devices, such as one or more micro-projectors, that project information of interest to a user for viewing. In some implementations, portions of the output (e.g., user interface) provided by output device 250 may function as both an input device and an output device.

Power supply 260 may include one or more batteries or other power source components used to supply power to components of user device 110.

Communication interface 270 may include a transceiver that enables user device 110 to communicate with other devices and/or systems. For example, communication interface 270 may include mechanisms for communicating via a network, such as a wireless, wired or optical network. As an example, communication interface 270 may include one or more radio frequency (RF) transmitters, receivers and/or transceivers and one or more antennas for transmitting and receiving RF data via a wireless network. Communication interface 270 may also include a modem or an Ethernet interface to a LAN.

User device 110 may provide a platform for a user to view information of interest via a virtual user interface or information projected onto a surface/object (e.g., a user's body part). User device 110 may also perform processing associated with providing a user interface that provides location, distance and/or direction information based on a location in which information of interest is displayed. User device 110 may perform these operations in response to processing logic 220 executing sequences of instructions contained in a computer-readable medium, such as memory 230. Such instructions may be read into memory 230 from another computer-readable medium via, for example, and communication interface 270. In alternative embodiments, hard-wired circuitry may be used in place of or in combination with software instructions to implement processes consistent with the invention. Thus, implementations described herein are not limited to any specific combination of hardware circuitry and software.

Figure 3:
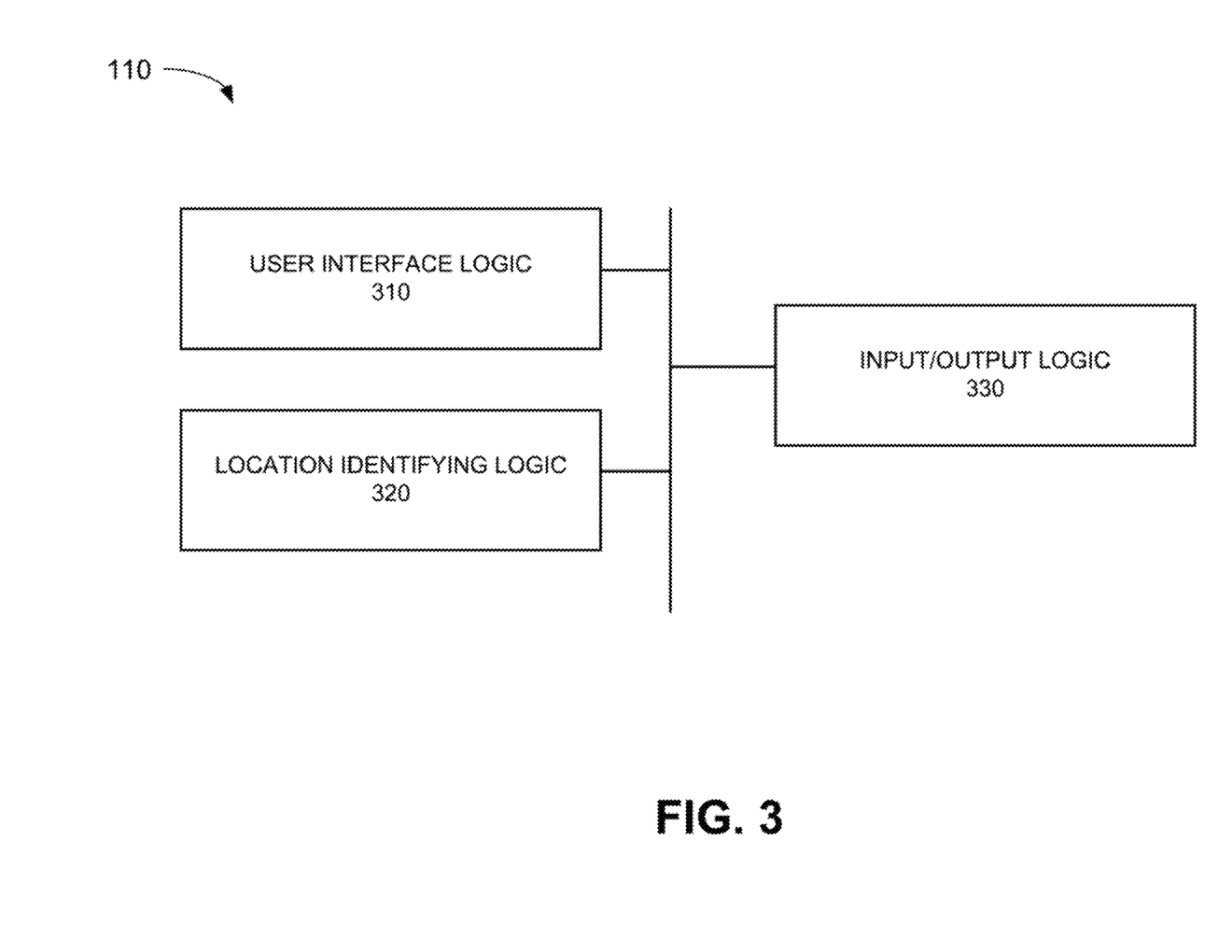
FIG. 3 is a block diagram of logic elements executed by the device of FIG. 2 according to an exemplary implementation.

FIG. 3 is an exemplary block diagram of logic components implemented in user device 110 of FIG. 2. In an exemplary implementation, some or all of the components (or a portion of the some/all of the components) illustrated in FIG. 3 may be stored in memory 230 and executed by processing logic 220.

Referring to FIG. 3, user device 110 may include user interface logic 310, location identifying logic 320 and input/output logic 330. User interface logic 310 may provide a user interface, such as user interface projected onto a surface, such as a body part associated with a user. For example, as discussed above, output device 250 may include AR glasses or another projection device that projects images onto a surface. In this case, user interface logic 310 may include logic that interacts with the projection device to provide the user interface, as described in more detail below.

Location identifying logic 320 may include logic that identifies distance and/or location information associated with items of interest. For example, location identifying logic 320 may determine a distance from user device 110 to various points of interest. These points of interest may be generated in response to a search query input by a user of user device 110. User interface logic 310 may receive the location information and graphically output points of interest based on the location and/or distance information, as described in detail below.

Input/output logic 330 may include logic configured to detect selections made via user interface logic 310. For example, input/output logic 330 may receive acoustic signals generated from tapping a part of the user's skin and determine the location of the tap. As an example, input/output logic 330 may detect a user's tap on a portion of his/her arm, identify an item corresponding to the input and forward the input to processing logic 220 for further processing, as described in more detail below.

Figure 4:
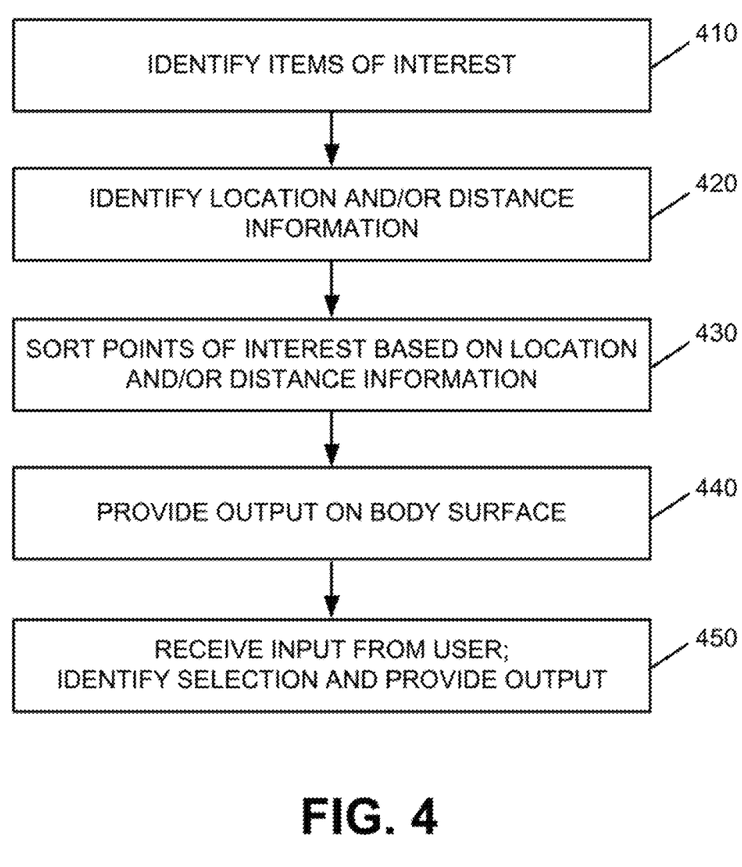
FIG. 4 is a flow diagram illustrating exemplary processing associated with the user device of FIG. 1.

FIG. 4 illustrates exemplary processing associated with displaying information of interest to a user. In this example, assume that output device 250 includes AR glasses or a projector that projects information of interest onto a surface of the user's body, such as the user's arm. Processing may begin with user device 110 identifying items of interest (block 410). For example, assume that the user is using user device 110 to locate places of interest, such as points of interest in Lund, Sweden. In this case, the user may enter a search query via input device 240 and processing logic 220 may forward the search query to, for example, server 120. Server 120 may receive the query, identify points of interest that meet the user's search query and provide information identifying the points of interest to user device 110 via network 130.

User device 110 receives the information from server 120. User device 110 may then process the information to generate an output listing for display. For example, location identifying logic 320 may identify the user's current geographical location (i.e., the location of user device 110) using a GPS system included on user device 110. Location identifying logic 320 may then then determine the distance to each of a number of points of interest returned to user device 110 from server 120.

For example, location identifying logic 320 may identify which of the points of interest are located within a predetermined distance (e.g., one mile) of the user (block 420). Location identifying logic 320 may also identify the direction in which the points of interest are located with respect to the location of user device 110 (block 420).

User interface logic 310 may receive the location information and/or direction information from location identifying logic 320 and sort the search results/list based on the distance and/or direction information (block 430). For example, user interface logic 310 may sort the points of interest from the point of interest located closest to the user to the point of interest located furthest from the user (block 430). User interface logic 310 may then project the sorted list onto a surface or body part of the user, such as the user's arm, hand, etc. (block 440).

Figure 5A:
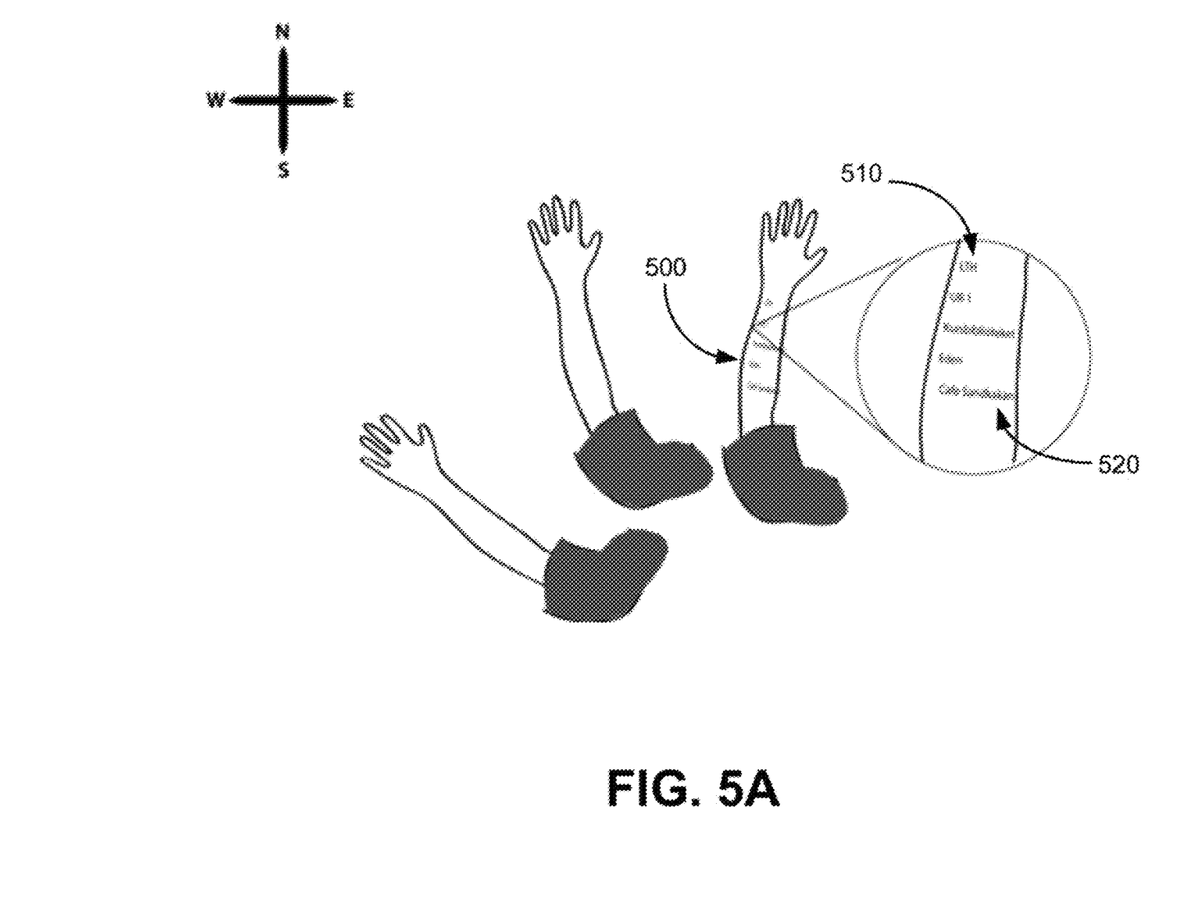
FIGS. 5A and 5B are diagrams illustrating exemplary user interfaces output by the user device of FIG. 1 in accordance with exemplary aspects of the invention.

In an exemplary implementation, user interface logic 310 may project the items of interest logically and/or physically spaced to provide relative distance information to the user. For example, assume that user interface logic 310 projects the points of interest onto the user's arm 500, as illustrated in FIG. 5A. In this case, the point of interest located closest to the user is displayed closest to the user's hand, as illustrated by point of interest 510 (illustrated in the close up view of the user's arm 500 in FIG. 5A). The remaining items projected onto user's arm may be located at increasingly further distances from the user, with item 520 being located the furthest distance from the user.

Figure 5B:
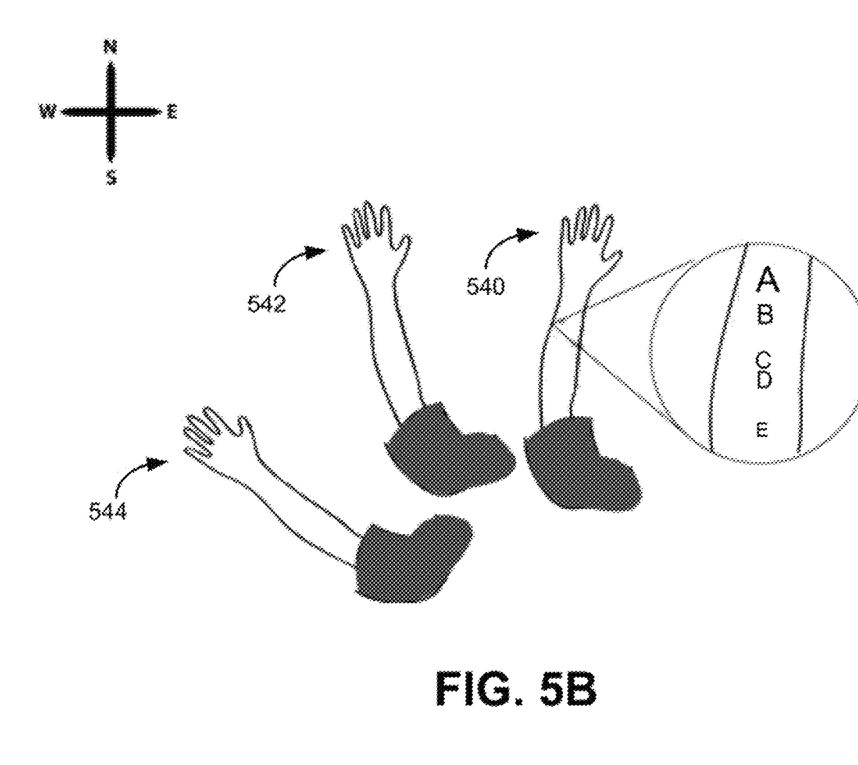

In some implementations, user interface logic 310 may project the items of interest such that the projected spacing of the items conveys relative distance information. For example, assume that user interface logic 310 identifies five items of interest to display on the user's arm 500, such as the five items of interest labeled A-E in FIG. 5B. Further assume that items A and B are located relatively close to each other (e.g., 100 meters apart) and that items B and C are located further apart from each other (e.g., 800 meters). In this implementation, user interface logic 310 may project items A and B on user's arm 500 such that they are displayed relatively closely to each other and project item C such that it is displayed further away from item B on user's arm 500 (as compared to the distance between items A and B), as illustrated in FIG. 5B. In this case, the user may easily determine that the point of interest identified by item B is very close to the point of interest identified by item A and that that item C is located quite a bit further from item B (as compared to the distance between the points of interest identified by items A and B).

Similarly, the distance between the points of interest associated with items D and E are conveyed to the user based on the relative distances projected on the user's arm 500. For example, the points of interest associated with items C and D are located very close to each other, as conveyed by the closeness with respect to items C and D displayed on the user's arm 500, whereas items D and E are located further apart from each other, as indicated by the greater distance between items D and E as projected on the user's arm 500.

In some implementations, user interface logic 310 may provide different font sizes with respect to the projected information and/or provide different colors with respect to the projected information to convey distance and/or other information. For example, referring to FIG. 5B, item A is shown in a larger font than items B-E. In this implementation, the larger font conveys that item A is located closer to the user than items B-E. Item E is also shown in a smaller font than items B-D, indicating that item E is located further from user device 110.

In still other implementations, user interface logic 310 may provide color information to convey distance and/or other information. For example, item 510 in FIG. 5A may be displayed in red (or some other color) to indicate that the point of interest is located very close to the user.

In some implementations, user interface logic 310 may dynamically update the information projected onto the user's arm as the distances change. For example, as the user walks (or drives) closer to a particular point of interest, that point of interest may be displayed closer to the user's hand, change color, change font size, etc., to indicate that the user is getting closer to the point of interest.

In still further implementations, the user may be wearing a magnetometer, gyro, accelerometer or other device on his/her wrist or hand that allows user interface logic 310 and/or location identifying logic 320 to detect a direction in which the user's hand and/or fingers are pointing. In other implementations, user device 110 may include an IR camera, video camera or other motion capturing device to detect a direction or change in direction in which the user's hand and/or fingers are pointing.

For example, assume that the user moves his/her arm 500 from the position illustrated as 540 in FIG. 5B to the position indicated by 542 in FIG. 5B. In this case, the magnetometer, gyro, accelerometer, IR camera, video camera, GPS system and/or other direction identifying device may track the movement of the user's arm 500 and detect the direction in which the user's hand, finger(s) and/or arm is pointing. User interface logic 310 may receive this information and modify the projected information based on the newly identified direction. For example, if the user's hand was pointing north as illustrated by 540 in FIG. 5B and moved to a northwest direction, as illustrated by 542, user interface logic 310 and/or location identifying logic 320 may identify the points of interest located in the northwest direction with respect to the user's location.

Similarly, if the user moves his arm to point to a more westerly direction, as illustrated by 544 in FIG. 5B, user interface logic 310 and/or location identifying logic 320 may identify points of interest located in the west direction with respect to the user's current location. In such implementations, user interface logic 310 may then project information regarding the points of interest with respect to the direction in which the user's hand/fingers/arm is pointing, regardless of an orientation of user device 110.

In each case, after various points of interest are displayed, the user may tap his/her arm at a location displaying one of the items of interest. For example, assume that the user taps his/her finger on his/her arm at the location identified by item 520 in FIG. 5A. Acoustic sensors located on an armband, wristband, hand, etc., of the user detect the acoustic waves generated by the tap and input/output logic 330 correlates the tap to the location corresponding to item 520 (block 450). In an exemplary implementation, input/output logic 330 may then provide output to the user based on the identified input (block 450).

For example, assume that item 520 identifies a cafe located relatively close the user. In this case, input/output logic 330 may retrieve additional information regarding the cafe, such as hours of operation, a menu, etc. User interface logic 310 may retrieve this information via, for example, an Internet search based on the name of the cafe. User interface logic 310 may then project the additional information onto the user's arm and/or provide the additional information on an output screen associated with user device 110 (e.g., an LCD screen).

In this manner, information projected onto a surface, such as the user's arm, may convey distance information. As a result, a user can easily ascertain distances or relative distances to points of interest.

CONCLUSION

Implementations described herein provide a user device that projects information of interest onto a real surface, such a body part associated with a user, or a virtual surface (e.g., a virtual screen). In each case, the information provided to the user conveys location and/or distance information with respect to the location of the user. The projected information may also be dynamically updated as the user moves and/or the user moves his/her hand or fingers to point in a different direction. By providing information of interest that conveys location and/or direction information, the user may easily identify items of interest.

The foregoing description of the embodiments described herein provides illustration and description, but is not intended to be exhaustive or to limit the invention to the precise form disclosed. Modifications and variations are possible in light of the above teachings or may be acquired from the practice of the invention.

For example, aspects have been described above with respect to certain scenarios with respect to projecting information onto a body part, such as the user's arm. In other implementations, the information may be projected onto another body part, such as the user's leg or foot. For example, when the user is sitting down, the information may be projected onto the user's leg. In still other implementations, the information may be projected onto a surface, such as a table, a wall, the ground, a screen, etc. In still other implementation, the information may be projected onto a virtual or AR screen provided by, for example, an AR visor or AR glasses. In these implementations, information may be projected by the AR visor or AR glasses onto a virtual body part. For example, AR glasses may project information identifying points of interest onto a virtual body part, such as virtual arm displayed on a screen. In such cases, the user may still tap his/her arm to provide input identifying one of the items of interest and user interface logic 310 may correlate the location of the input on the user's real arm to the information provided on the virtual arm.

In addition, aspects have been described above with respect to identifying direction information, such as the direction in which a user's hand or fingers are pointing, using a magnetometer, GPS, gyro or accelerometer worn on a user's wrist or arm, or via some type of camera (e.g., IR camera, video camera) or motion capturing system. In other implementations, the direction identifying device may be embodied in an AR visor, a bracelet or watch-like device worn on the user's wrist that includes sensors to detect direction, image processing devices that detect direction, or any other devices that detect direction.

Further, while series of acts have been described with respect to FIG. 4, the order of the acts may be varied in other implementations consistent with the invention. Moreover, non-dependent acts may be performed in parallel.

It will also be apparent to one of ordinary skill in the art that aspects of the invention, as described above, may be implemented in computer devices, cellular communication devices/systems, media playing devices, methods, and/or computer program products. Accordingly, aspects of the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an ASIC, an FPGA or other processing logic, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

The scope of the invention is defined by the claims and their equivalents.

The invention claimed is:

1. A user device, comprising:
a memory that stores processing logic and output logic;
a processor that executes the processing logic and the output logic; and
a projector; and:
wherein the user device has an orientation dependent on a spatial direction of the user device;
wherein execution of the processing logic configures the user device to:
receive information identifying points of interest located relative to the user device in plural directions,
identify location and distance information from each of the points of interest to the user device,
sort the points of interest based on the location and distance information;
determine a direction in which a user's arm is pointing; and
identify points of interest that are in the direction in which the user's arm is pointing and regardless of the orientation of the user device; and
wherein execution of the output logic configures the user device to:
project information, with the projector, identifying the points of interest that are identified based on the direction of the user's arm onto the user's arm, wherein the projected information is displayed in accordance with the distance sorting;
identify a touch input on the user's arm at a location displaying one of the points of interest; and
project additional information about the point of interest corresponding to the touch input.

2. The user device of claim 1, wherein when projecting information, the output logic is configured to:
display the points of interest on the arm in an order, wherein a first point of interest located closest to the user device is displayed at one end of the projected information and a second point of interest located furthest from the user device is displayed at an opposite end of the projected information.

3. The user device of claim 1, wherein when projecting information, the output logic is configured to:
space the points of interest projected onto the arm based on geographical distances between the points of interest, wherein the spacing between the points of interest is less for points of interest located shorter geographical distances apart than for points of interest located greater geographical distances apart.

4. The user device of claim 1, wherein when projecting information, the output logic is configured to:
provide at least one of different colors or different font sizes for at least some of the projected points of interest, wherein the different colors or font sizes convey relative geographical distance information from the points of interest to the user device.

5. The user device of claim 1, wherein when projecting information, the output logic is configured to:
dynamically update the projected information as the user device moves, based on updated geographical distances from the user device to the points of interest.

6. The user device of claim 1, wherein the processing logic is further configured to:

detect a change in the direction in which the user's arm is pointing, and identify new points of interest based on the changed direction, and wherein the output logic is further configured to:

project information onto the arm identifying the new points of interest.

7. The user device of claim 1, wherein the processing logic is located in a mobile terminal or a portable computer portion of the user device and the output control logic is located in an augmented reality device portion of the user device.

8. A method, comprising:

receiving, by a user device, information identifying points of interest located relative to the user device in plural directions, wherein the user device has an orientation dependent on a spatial direction of the user device;

identifying location and distance information from the user device to each of the points of interest;

sorting the points of interest based on the location and distance information;

determining a direction in which a user's arm is pointing;

identifying points of interest that are in the direction in which the user's arm is pointing and regardless of the orientation of the user device;

projecting information identifying the points of interest that are identified based on the direction of the user's arm onto the user's arm, wherein the projected information is displayed in accordance with the distance sorting;

identifying a touch input on the user's arm at a location displaying one of the points of interest; and projecting additional information about the point of interest corresponding to the touch input.

9. The method of claim 8, further comprising:

displaying the points of interest on the surface in an order, wherein a first point of interest located closest to the user device is displayed at one end of the projected information and a second point of interest located furthest from the user device is displayed at an opposite end of the projected information.

10. The method of claim 8, wherein the projecting information comprises:

spacing the items of interest projected onto the arm based on geographical distances between the points of interest, wherein the spacing between the points of interest is less for points of interest located shorter geographical distances apart than for points of interest located greater geographical distances apart.

11. The method of claim 8, wherein the projecting information comprises:

providing at least one of different colors or different font sizes for at least some of the projected points of interest, wherein the different colors or font sizes convey relative geographical distance information from the points of interest to the user device.

12. The method of claim 8, further comprising:

dynamically update the projected information as the user device moves, based on updated geographical distances from the user device to each of the points of interest.

13. The method of claim 8, further comprising:

detecting a change in the direction in which the user's arm is pointing;

identifying new points of interest based on the changed direction; and projecting information onto the arm identifying the new points of interest.

14. A non-transitory computer-readable medium of a user device and having stored thereon sequences of instructions which, when executed by at least one processor of the user device, cause the at least one processor to:

receive information identifying points of interest located relative to the user device in plural directions, wherein the user device has an orientation dependent on a spatial direction of the user device;

identify location and distance information from each of the points of interest to the user device in which the computer-readable medium is stored;

sort the points of interest based on the location and distance information;

determine a direction in which a user's arm is pointing;

identify points of interest that are in the direction in which the user's arm is pointing and regardless of the orientation of the user device;

output, to a projection device for projection onto the user's arm, information identifying the points of interest that are identified based on the direction of the user's arm, wherein the information is displayed in accordance with the distance sorting;

identify a touch input on the user's arm at a location displaying one of the points of interest; and project additional information about the point of interest corresponding to the touch input.

15. The non-transitory computer-readable medium of claim 14, wherein the projection device comprises an augmented reality projection device.

* * * * *